United States Patent
Kondareddy et al.

(10) Patent No.: US 8,937,956 B2
(45) Date of Patent: Jan. 20, 2015

(54) INTERLEAVING AUDIO AND VIDEO PACKETS

(75) Inventors: Ragu (Raghunatha) Kondareddy, Sunnyvale, CA (US); Yasantha N. Rajakarunanayake, San Ramon, CA (US); James F. Dougherty, III, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 478 days.

(21) Appl. No.: 13/333,998

(22) Filed: Dec. 21, 2011

(65) Prior Publication Data

US 2012/0307147 A1 Dec. 6, 2012

Related U.S. Application Data

(60) Provisional application No. 61/491,838, filed on May 31, 2011.

(51) Int. Cl.
| | |
|---|---|
| *H04L 12/28* | (2006.01) |
| *H04J 3/16* | (2006.01) |
| *H04J 3/24* | (2006.01) |
| *H04W 72/12* | (2009.01) |
| *H04L 29/08* | (2006.01) |
| *H04W 72/10* | (2009.01) |

(52) U.S. Cl.
CPC ..... *H04W 72/1242* (2013.01); *H04L 29/08009* (2013.01); *H04L 69/322* (2013.01); *H04W 72/10* (2013.01)
USPC ........................ 370/395.42; 370/469; 370/474

(58) Field of Classification Search
None
See application file for complete search history.

(56) References Cited

U.S. PATENT DOCUMENTS

| | | | | |
|---|---|---|---|---|
| 5,343,473 | A * | 8/1994 | Cidon et al. | 370/465 |
| 2004/0176168 | A1 * | 9/2004 | Tsao et al. | 463/42 |
| 2006/0088058 | A1 * | 4/2006 | Eckert et al. | 370/469 |
| 2006/0198303 | A1 * | 9/2006 | Iacono et al. | 370/229 |
| 2009/0168774 | A1 * | 7/2009 | Soejima et al. | 370/389 |
| 2010/0150173 | A1 * | 6/2010 | Yu et al. | 370/474 |
| 2012/0063462 | A1 * | 3/2012 | Hu et al. | 370/394 |

FOREIGN PATENT DOCUMENTS

| | | |
|---|---|---|
| WO | 2007022441 A1 | 2/2007 |
| WO | 2011061003 A1 | 5/2011 |

OTHER PUBLICATIONS

European Patent Office; EP Application No. 12003842.7-1525; EP Search Report dated Sep. 27, 2012; 3 pgs.

\* cited by examiner

*Primary Examiner* — Faruk Hamza
*Assistant Examiner* — Cassandra Decker
(74) *Attorney, Agent, or Firm* — Garlick & Markison; Edward J. Marshall (57) ABSTRACT

A network device receives multiple protocol data units (PDUs), or packets, and initiates aggregation of an intended number of the packets to form a transmission block. During the aggregation process, the device receives a priority PDU, or packet, and in response to receiving the priority PDU, terminates the aggregation process, either permanently or temporarily, even though the number of packets aggregated prior to receiving the priority packet is less than the number of packets intended to be included in the transmission block. The device releases the priority packet for transmission out of turn, ahead of the already aggregated packets. The priority packet can be released individually, with the aggregation being resumed after release of the priority packet, or the priority packet can be pre-pended to the already aggregated block of packets and the entire block released with a priority assigned according to the priority of the priority packet.

20 Claims, 9 Drawing Sheets

INTERLEAVING AUDIO AND VIDEO PACKETS

CROSS REFERENCE TO RELATED PATENTS

This application claims the benefit of U.S. Provisional Application No. 61/491,838, filed May 31, 2011, and entitled "Media Communications And Signaling Within Wireless Communication Systems," which is incorporated herein in its entirety by reference for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND

1. Technical Field

This invention relates generally to aggregating data for transmission, and more particularly to aggregating different categories of data.

2. Description of Related Art

In packet-switched communication network using the Open System Interconnection (OSI) model, data packets are encoded and decoded into bits in the data link layer. The data link layer can be further divided into the medium access control layer (MAC), which essentially emulates a full-duplex logical communication channel, and the logical link controller layer (LLC) that controls frame synchronization, flow control, and error checking. MAC layer data units are delivered to the physical layer (PHY), which prepares the data for physical transmission over various mediums. Data units at both the PHY layer and the MAC layer are sometimes referred to as packets or protocol data units (PDUs). Thus, the terms "packet," "PDU," and "data unit" are sometimes used interchangeably.

Figure 1:
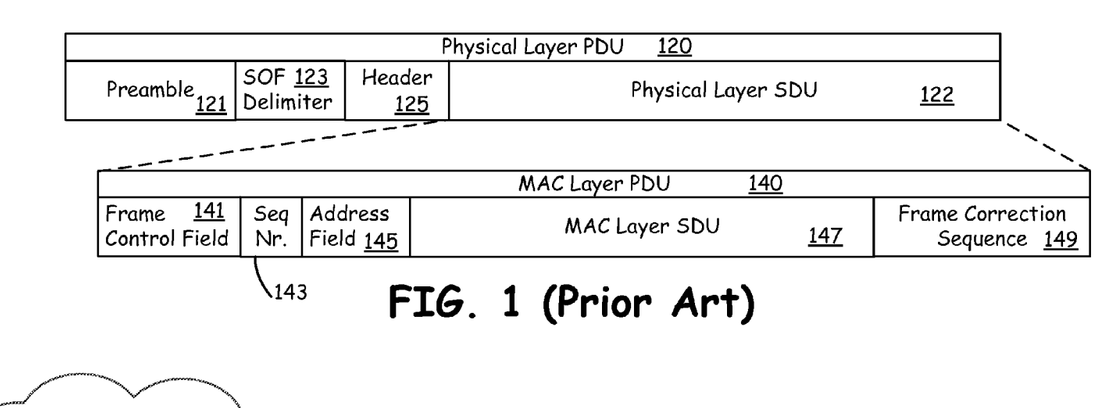
FIG. 1 is a prior art diagram illustrating the relationships between the MAC and the PHY layer.

Prior art FIG. 1 shows MAC layer PDU (MPDU) 140, which includes frame control field 141, sequence number 143, address field 145, MAC layer service data unit (MSDU) 147, and frame correction sequence 149. The MSDU 147 can be considered to be the payload of the MPDU 140. PHY layer PDU (PPDU) 120 includes preamble 121, start of frame (SOF) delimiter 123, header 125 and PHY layer SDU (PSDU) 122. PSDU 122 can be considered to be the payload of the PPDU 120, and as illustrated includes the entire MPDU 140, including overhead bits, not just the MSDU 147.

To reduce the overhead associated with transmitting each MAC layer packet using a single PHY layer packet, some communication protocols allow multiple MAC layer packets to be aggregated into a single PHY layer packet for transmission. For example, multiple MPDUs can be aggregated and sent together using a single PPDU. This aggregation can be especially useful in situations where each data unit may have significant overhead (preambles, headers, cyclic redundancy check, etc.), or where the expected packet size is small compared to the maximum amount of information that can be transmitted using a single packet.

The technique of aggregating multiple frames, packets, or data units into a single transmission unit is often used with block acknowledgements (ACKs). For example, rather than sending separate PHY layer packets, each corresponding to a single MAC layer packet, a block of up to 64 MAC layer packets can be transmitted together in a single PHY packet using one physical layer header. Once the data block has been sent, a single block ACK is returned, rather than requiring individual ACK messages for each individual MAC layer packet.

In conventional systems, once the aggregation of MAC layer packets into a block has begun, aggregation continues until aggregation is completed, and released to the PHY layer for transmission. If a priority data packet is received while aggregation is in process, the priority data is released following release of the block of aggregated data. For example, if a conventional system is in the middle of aggregating video packets at the MAC layer, and a high priority audio packet is received, the audio packet is released to the PHY layer after the aggregated video packets are released.

In some cases, however, waiting for the aggregation to complete can cause unacceptable delays in delivering priority data, such as real-time audio packets. Additionally, if another audio packet is received before the first audio packet has been released to the PHY layer, both audio packets may be sent back-to-back, resulting in perceived low quality audio reproduction. Furthermore, in cases where video content is synchronized to audio content, if audio packets are delayed too long it may be more difficult to properly synchronize the video content. Thus, currently available systems and techniques leave room for improvement.

DETAILED DESCRIPTION

In general, various embodiments of the disclosure allow priority packets of any type to be processed out of turn. For example, even if MAC layer protocol data units (PDUs) are being aggregated for block transmission by the PHY layer, a priority packet can be released for transmission even before the PDUs being aggregated are released. Thus, if video packets are being aggregated in the MAC layer, and a high priority audio packet is received, the high priority audio packet can be released to the PHY layer for transmission prior to the video packets already being aggregated.

As used herein, the terms "protocol data unit," "data unit," "service data unit," and "packet," may be used interchangeably, except as otherwise specifically noted, or as required by the context in which the terms are used. Furthermore, although the following description refers primarily to data units within the MAC and PHY layers of an OSI protocol processing model, the discussion should not be considered to be limited to only MAC and PHY layers. The general principles and techniques taught herein apply equally to other processing models used for communication over packet switched networks, or other networks in which packets may be delivered from an originating device to a destination device in an order different than the order in which the packets are originally generated or transmitted.

Figure 2:
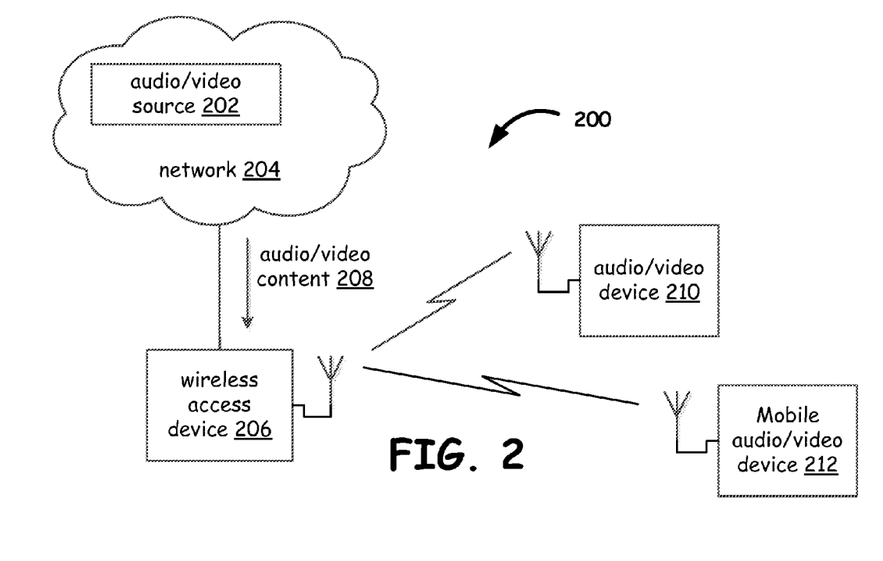
FIG. 2 is a diagram illustrating a system according to various embodiments of the present disclosure.

Referring now to FIG. 2, a block diagram representation of a network 200 in accordance with an embodiment of the present invention. The network 204 distributes information such as audio/video content 208 from an audio/video source 202 to a wireless access device 206 for wireless transmission to wireless audio/video devices, such as audio/video device 210 and mobile audio/video device 212, over one or more wireless channels. The audio/video content 208 can include movies, television shows, commercials or other advertisements, educational content, video gaming content, infomercials, or other program content and optionally additional data associated with such program content including but not limited to digital rights management data, control data, programming information, additional graphics data and other data that can be transferred in association with program content. Audio/video content 208 can include video with or without associated audio content. The audio/video content 208 can be sent as broadcast video, streaming video, video on demand and near video on demand programming and/or other formats.

The network 204 can be a dedicated media distribution network, such as a direct broadcast satellite network or cable television network that distributes audio/video content 208 from a plurality of audio/video sources, including audio/video source 202, to a plurality of wireless access devices and, optionally, wired devices over a wide geographic area. In the alternative, network 204 can be a heterogeneous network that includes one or more segments of a general purpose network such as the Internet, a metropolitan area network, wide area network, local area network or other network and optionally other networks such as an Internet protocol (IP) television network. Over various portions of a given network, the audio/video content 208 can be carried as analog and/or digital signals according to various recognized protocols.

Wireless access device 206 can include a base station or access point that provides audio/video content 208 to a plurality of video subscribers over a wireless local area network (WLAN) such as an 802.11a,b,g,n, WIMAX or other WLAN network, or a cellular network such as a UMTS, EDGE, 3G, 4G or other cellular data network. In addition, the wireless access device 206 can comprise a home gateway, video distribution point in a dedicated video distribution network or other wireless gateway for wirelessly transmitting audio/video content 208, either alone or in association with other data, signals or services, to audio/video device 210 and/or mobile audio/video device 212.

Mobile audio/video device 212 can include a video enabled wireless smartphone or other handheld communication device that is capable of displaying audio/video content. Audio/video device 210 includes other video display devices that may or may not be mobile including a television coupled to a wireless receiver, a computer with wireless connectivity via a wireless data card, wireless tuner, WLAN modem or other wireless link or device that alone or in combination with other devices is capable of receiving audio/video content 208 from wireless access device 206 and displaying and/or storing the audio/video content 208 for a user.

The network 204, wireless access device 206, audio/video device 210 and/or mobile audio/video device 212 include one or more features of the present invention that will be described in greater detail below.

Figure 3:
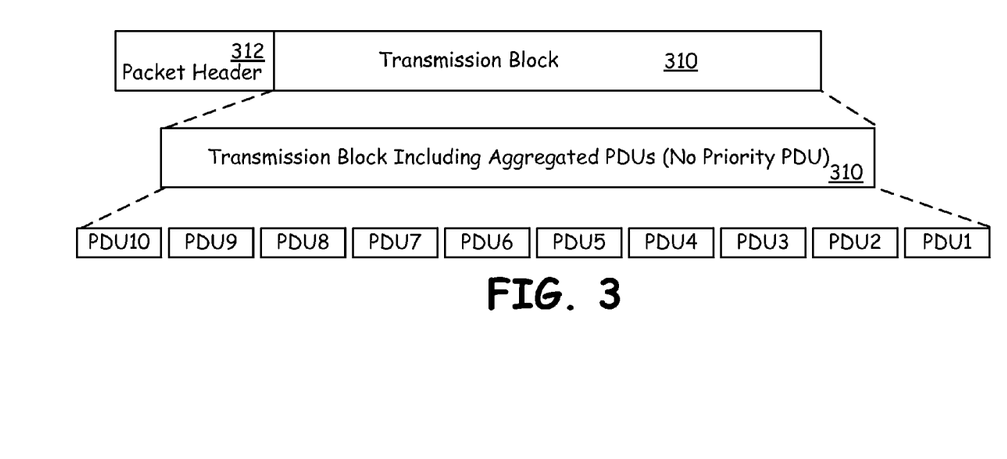
FIG. 3 is a diagram illustrating aggregation of non-priority data units according to various embodiments of the present disclosure.

Referring next to FIG. 3, aggregation of data units, or packets, according to an embodiment of the present disclosure will be discussed. FIG. 3 illustrates protocol data units PDU1-PDU10 being aggregated into a transmission block 310, where no higher priority packet is received during aggregation. Transmission block 310 can be sent using a single packet header 312. In some embodiments, PDU1-PDU10 correspond to MAC layer PDUs, such MPDU 140 (FIG. 1). In other embodiments, PDU1-PDU10 correspond to MAC layer SDUs, such as MSDU 147 (FIG. 1). Thus, when PDU1-PDU10 are aggregated into transmission block 310, each PDU may include its own overhead information as illustrated in FIG. 1. Where PDU1-PDU10 correspond to MSDU 147 (FIG. 1), PDU1-PDU10 may not include the same overhead information generally included in MPDU 140 (FIG. 1).

The number of PDUs aggregated into transmission block 310 can vary depending on a number of factors, including the transmission protocol being used, which may limit the number of PDUs that can be aggregated into a single transmission block, the quality of the link over which the transmission block is transmitted, which affects the number of retransmissions required, the size of the PDUs, where size limits may mean that fewer large PDUs can be sent than small PDUs.

Under normal operating conditions, communication systems tend to settle to a level of packet aggregation in which a certain number of packets data units are likely to be aggregated into a single transmission block. The number of data units, or packets, intended to be included in a transmission block is based on the type of information, and system parameters, as noted above. Thus, although a system may be capable of transmitting blocks having a size of, for example 64 packets, in reality the system may settle to transmitting blocks having an intended size of 12 packets. Note that the intended number of data units or packets per block is variable, and can usually be determined dynamically, during system operation. In some cases, the intended number of packets to be included in each transmission block can vary significantly from one transmission frame to another. Thus, as used herein, the phrases "intended number of data units," "intended number of packets," and similar derivative terms refers to the number of data units scheduled for inclusion in a particular transmission block, regardless of what that exact number may, in fact be, and despite the fact that the intended number of data units scheduled for inclusion in any particular transmission block may vary from the intended number of data units to be included in other transmission blocks.

Figure 4:
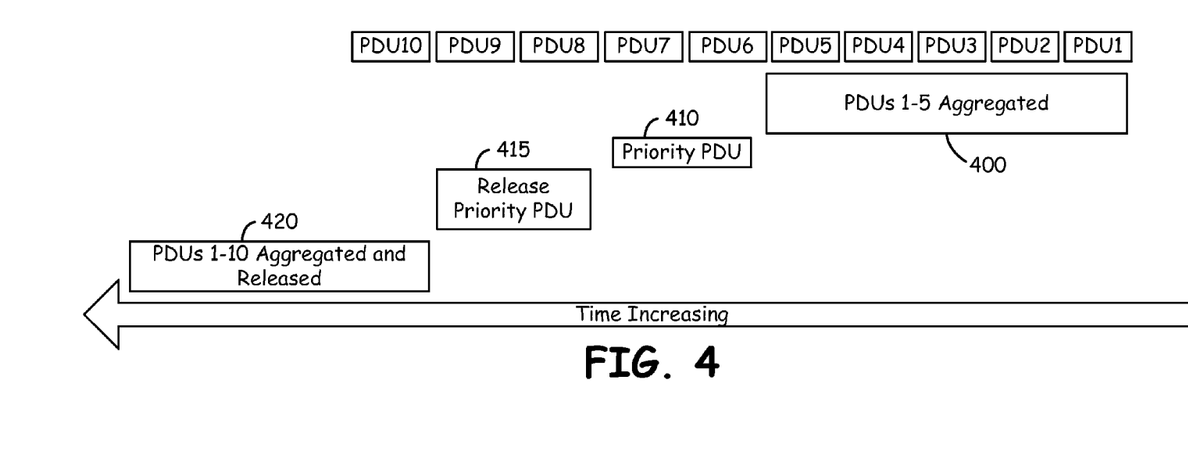
FIG. 4 is a diagram illustrating aggregation and release of data units when a priority data unit has been received, according to various embodiments of the present disclosure.

Referring next to FIG. 4, an example of handling a priority data unit received during aggregation of other data units will be discussed according to embodiments of the present disclosure. In the illustrated embodiment, PDU1-PDU10 are being aggregated for transmission in a transmission block having an intended size of 10 data units. As shown in FIG. 4, PDU1-PDU5 are received and aggregated at 400 before priority PDU is received at 410. Because priority PDU 410 is received before all ten PDUs intended for inclusion in a transmission block have been aggregated, the aggregation of PDUs is discontinued, at least temporarily, until after priority PDU is released at 415—before any further aggregation of the PDUs into the transmission block is performed. After the priority PDU is released at 415, the remaining PDUs, PDU6-PDU10 are aggregated into the same transmission block as PDU1-PDU5, and all ten PDUs are released in a transmission block at 420.

In at least some embodiments, aggregation of PDUs is used in conjunction with block acknowledgments (ACKs) to preserve channel bandwidth. Transmission of a block including the aggregated PDUs can take place via a wired or wireless packet switched network. By halting, at least temporarily, the aggregation of the video PDU1-PDU10 in response to receiving a priority PDU, the priority PDU can be released for transmission out-of-turn, so that the priority PDU does not need to wait for all of PDU1-PDU10 to be aggregated before being transmitted.

Note that although in some implementations aggregation of packets is temporarily halted, in embodiments where packet aggregation can continue while priority PDU 410 is being released for transmission, for example where parallel processors or the like are used, aggregation of packets can continue, subject to priority PDU 410 being released for transmission prior to the aggregated packets being released.

Receiving PDUs can refer to receiving one or more packets from a network interface, or receiving data generated by a source internal to the device aggregating the PDUs for transmission. Receiving PDUs can also refer to the PDUs being received at a particular processing layer, such as the MAC layer, the PHY layer, or otherwise. For example, PDU1-PDU10 can include video content to be synchronized to audio content included in priority PDU 410. Both the audio and video PDUs can be generated by one or more media devices, such as a Blu-ray player, a DVD player, an MP3 player, an MPEG player or the like.

It should be appreciated, that although the present example and other examples given herein referred to audio and video data, the scope of the disclosure is not limited to only audio and video data, but can also be applied to other categories of data. For example, the priority PDU 410 can include a category of data such as, timing data, base image data, or some other type of data having lower latency requirements than other PDUs being aggregated. Thus, if PDU1-PDU10 belong to a first category of data having a priority less than the priority of a second category of data to which the priority PDU 410 belongs, the priority PDU 410 can be released for transmission out of turn, without waiting for the transmission block of lower priority data units to be fully aggregated and released.

Figure 5:
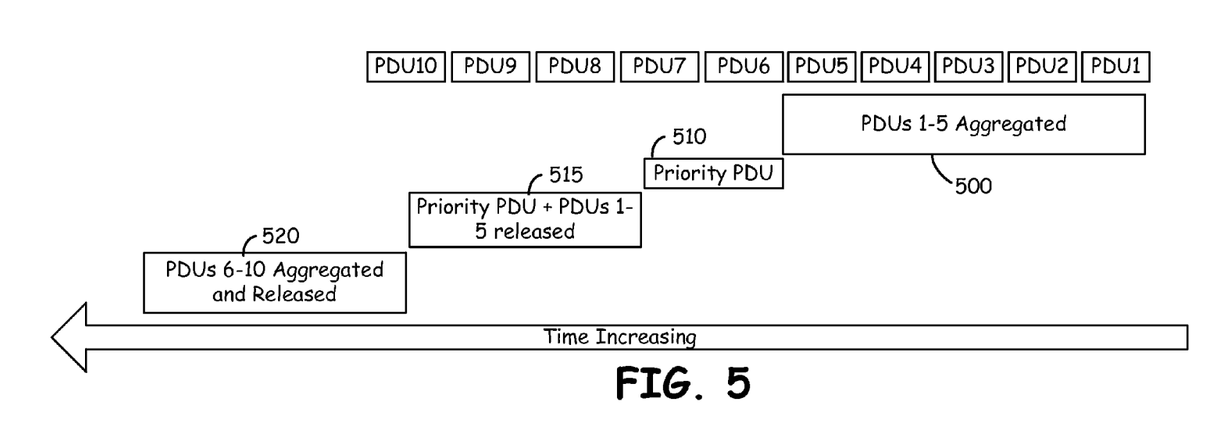
FIG. 5 is a diagram illustrating aggregation and release of data units when a priority data unit is received during aggregation, according to various embodiments of the present disclosure.

Referring next to FIG. 5, another example of handling a priority PDU, received during a time when lower priority data units are being aggregated for block transmission, is illustrated and discussed. As shown in FIG. 5, the intended number of PDUs, or packets, to be included in a transmission block is ten. After PDU1-PDU5 have been aggregated at 500 a priority PDU 510 is received. By way of contrast to the embodiments discussed with reference to FIG. 4, however priority PDU 510 is added to PDU1-PDU5, which have already been aggregated, to form a priority transmission block 515. Priority transmission block 515 is released substantially immediately after priority PDU510 has been added to it.

Note that adding the priority PDU 510 to the already aggregated PDUs can include pre-pending the priority PDU 510 to the already aggregated PDUs. In this way, the priority PDU 510 is advanced out of turn, and released before the already aggregated PDUs. Releasing the already aggregated PDUs in the same transmission block as the priority PDU 510 can make more optimal use of the transmission block scheme. That is, rather than simply sending a single high priority PDU in a transmission block, use is made of the already aggregated PDUs to use more of the transmission block's capacity, without significant delay to the priority PDU. In this case, after the priority transmission block 515, which includes PDU1-PDU5 and the priority PDU 515, is released, PDU6-PDU10 can be aggregated and released in the next transmission block. In some embodiments, although not specifically illustrated with respect to FIG. 5, an additional five PDUs can be added to PDU6-PDU10 and released as a full transmission block, thereby making full use of the intended size of the transmission block, without unnecessarily delaying priority data units from being released.

Figure 6:
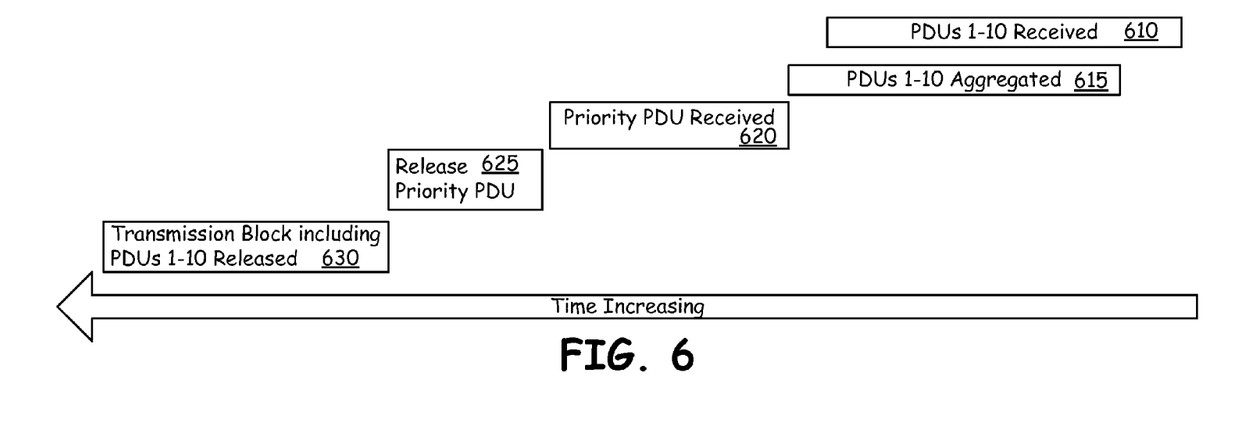
FIG. 6 illustrates out of turn release of a priority data unit in conjunction with aggregation of data units according to various embodiments of the present disclosure.

Referring next to FIG. 6, another example of handling a priority PDU will be discussed according to various embodiments of the present disclosure. In FIG. 6, the intended size of the transmission block is ten PDUs. PDU1-PDU10 have been received at 610, and aggregation of PDU1-PDU10 is performed at 615. Prior to the aggregated block of PDUs being released, however, a priority PDU is received at 620.

In this example, the priority PDU is released at 625—before the aggregated PDUs are released at 630, despite the fact that the aggregated PDUs have already been combined into a transmission block for transmission. In this way, the priority PDU can be released and transmitted out-of-turn, to avoid any delays that may arise due to the transmission of the transmission block including PDU1-PDU10. In some cases significant time savings may result from releasing the priority PDU ahead of a transmission block of already aggregated data units, especially if the aggregated data units are large.

Various combinations of the preceding embodiments can also be employed, with the particular choice of how to treat priority PDUs being determined based on network traffic parameters, processing delay parameters, priority differences between various categories of data units, or the like. For example, if the priority difference between a priority PDU and a group of non-priority PDUs is below a certain threshold, the priority PDU may be pre-pended to an already aggregated group of PDUs, or even appended to a partially filled transmission block, depending on whether an evaluation of latency parameters indicates that doing so would or would cause an unacceptable delay.

Figure 7:
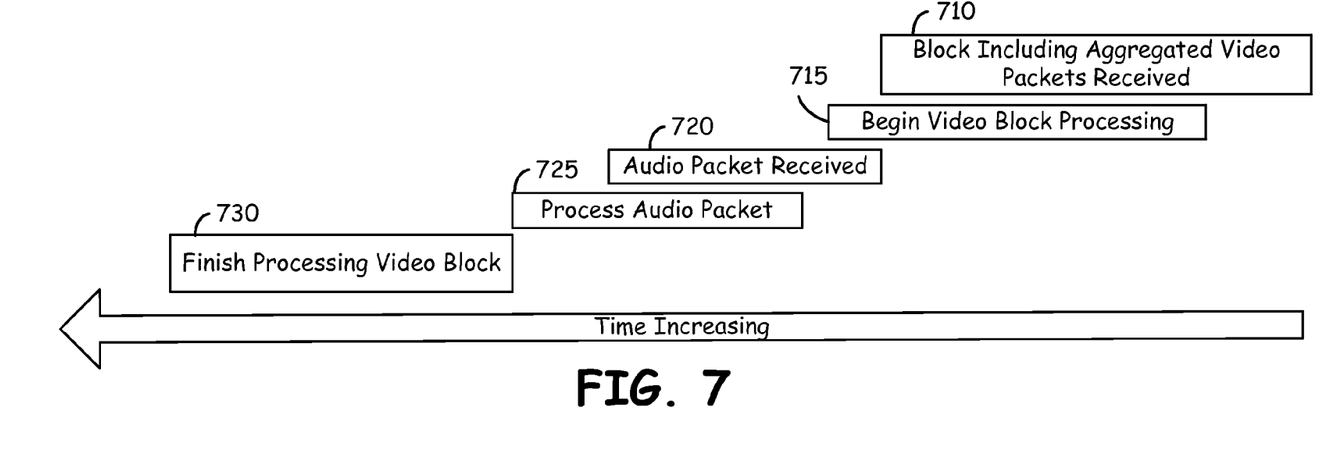
FIG. 7 illustrates out of turn processing of audio packets at a receiver, according to various embodiments of the present disclosure

Referring next to FIG. 7, an example of handling a priority PDU at a receiving node will be discussed according to various embodiments of the present disclosure. In FIG. 7, a block of packets including aggregated video packets is received at 710. Processing of the block of video packets begins at 715, but before the processing is complete, an audio packet is received at 720. In the illustrated embodiment, the video packets have lower priority than the audio packets. Consequently, processing of the video packets can be suspended, and processing of the audio packet performed at 725. Once the audio packet has been processed, processing of the block of video packets can be completed at 730. Processing of the video packets can include segregating the video packets from the aggregation of video packets in the block. Suspending processing of the video packets can include stopping the de-aggregation process mid-stream, and processing the audio packet out of turn, even before the de-aggregation of the video packets from the transmission block is completed.

Figure 8:
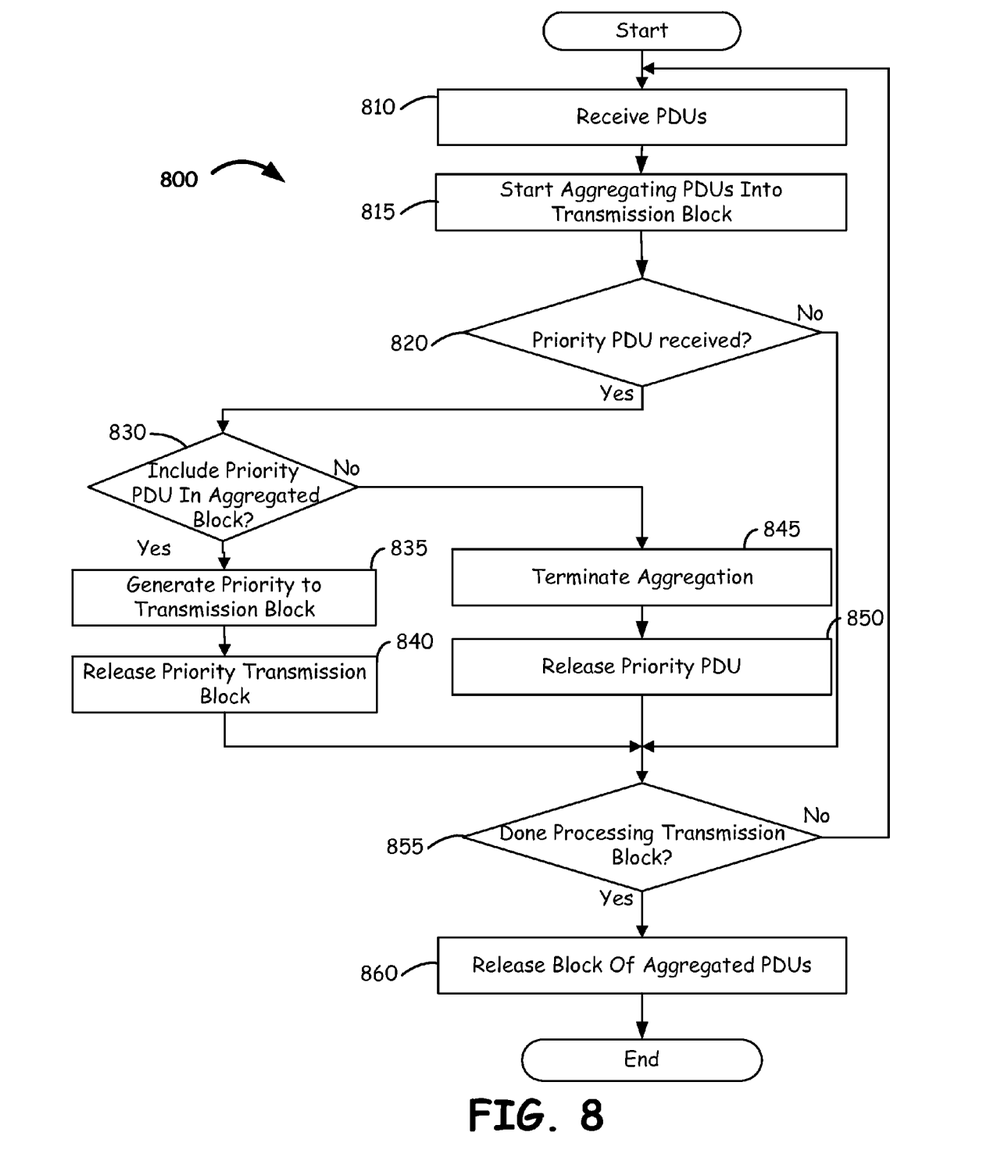
FIG. 8 is a flowchart illustrating out-of-turn processing of data units at a transmitting device according to various embodiments of the present disclosure.

Referring next FIG. 8, a method 800 according to various embodiments of the present disclosure will be discussed. As illustrated by block 810, PDUs are received for processing either at a particular device, network node, or at a particular processing layer within the device or network node. In at least one embodiment, the PDUs received include video data having a relatively liberal latency requirement compared to real-time audio data, to which the video data is to be synchronized. As illustrated at block 815, the PDUs are aggregated into a transmission block having an intended size as the PDUs are received. In various implementations the video PDUs can be temporarily stored in a cache memory prior to being aggregated, consistent with latency requirements.

A check is made at block 820 to determine whether the PDU received is a priority PDU. If the PDU received is not a priority PDU, a check is made at block 855 to determine whether the transmission block is full, meaning that the transmission block already includes the intended number of PDUs. If the transmission block is not full, processing continues at block 810 until either a priority PDU is received, or the transmission block becomes full.

If it is determined that block 855 that the transmission block is full and no more aggregation is to be performed, the block of aggregated PDUs is released, as shown at block 860. If, at some point during the aggregation of the non-priority PDUs it is determined (at block 820) that a priority PDU has been received, a check can be made at block 830 to determine whether to include the priority PDU in the transmission block with the already aggregated PDUs.

If the priority PDU is to be included in the block of already aggregated PDUs, a priority transmission block is generated, as illustrated by block 835. After the priority transmission block has been generated, it is released, as illustrated by block 840.

Because it is possible that there were some PDUs not aggregated into the transmission block, after the priority transmission block is released, another check is performed at 855 to determine whether the original transmission block has finished processing, which can include checking to determine whether additional non-priority PDUs remain to be aggregated. If so processing continues at block 810, until it is determined at block 855 that processing the transmission block has finished, at which point the remaining block of aggregated PDUs is released as illustrated by block 860.

Figure 9:
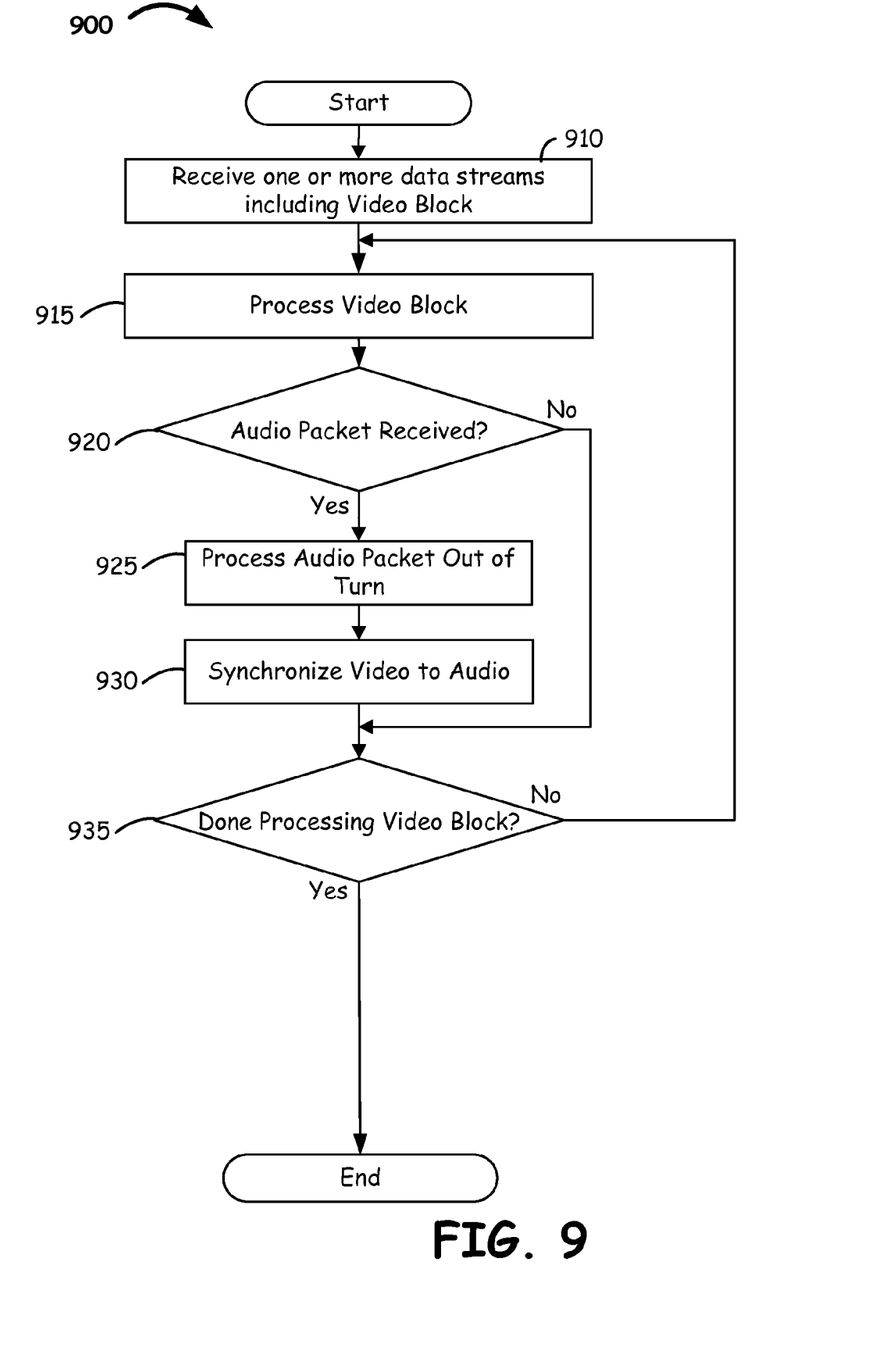
FIG. 9 is a flowchart illustrating out-of-turn processing of a priority data packet at a receiver, according to various embodiments of the present disclosure.

Referring next FIG. 9, a method 900 implemented in a network node receiving audio video packets to be synchronized is illustrated and discussed. As illustrated by block 910, one or more data streams including video content are received. The data stream can be mixed audio and video packets. In some cases separate video and audio streams are received. As illustrated by block 915, the network node begins to process the video content until an audio packet is received. If it is determined a block 920 that an audio packet has been received, the audio packet is processed out of turn, as illustrated by block 925.

The audio packet can be used to synchronize the video content as illustrated by block 930. After the audio and video have been synchronized, a check can be made at block 935 to determine if all of the video content in the video block has been processed.

If it is determined at block 920 that an audio packet has not been received, check is made at block 935 to determine if the video processing has been completed. If the video processing is not complete, the method returns to block 915.

Note that in some embodiments where multiple video and audio streams are received, any real-time audio packet received can be processed out of turn, ahead of any video packet in any stream, regardless of whether the audio packet is related to the block of video content being received.

Figure 10:
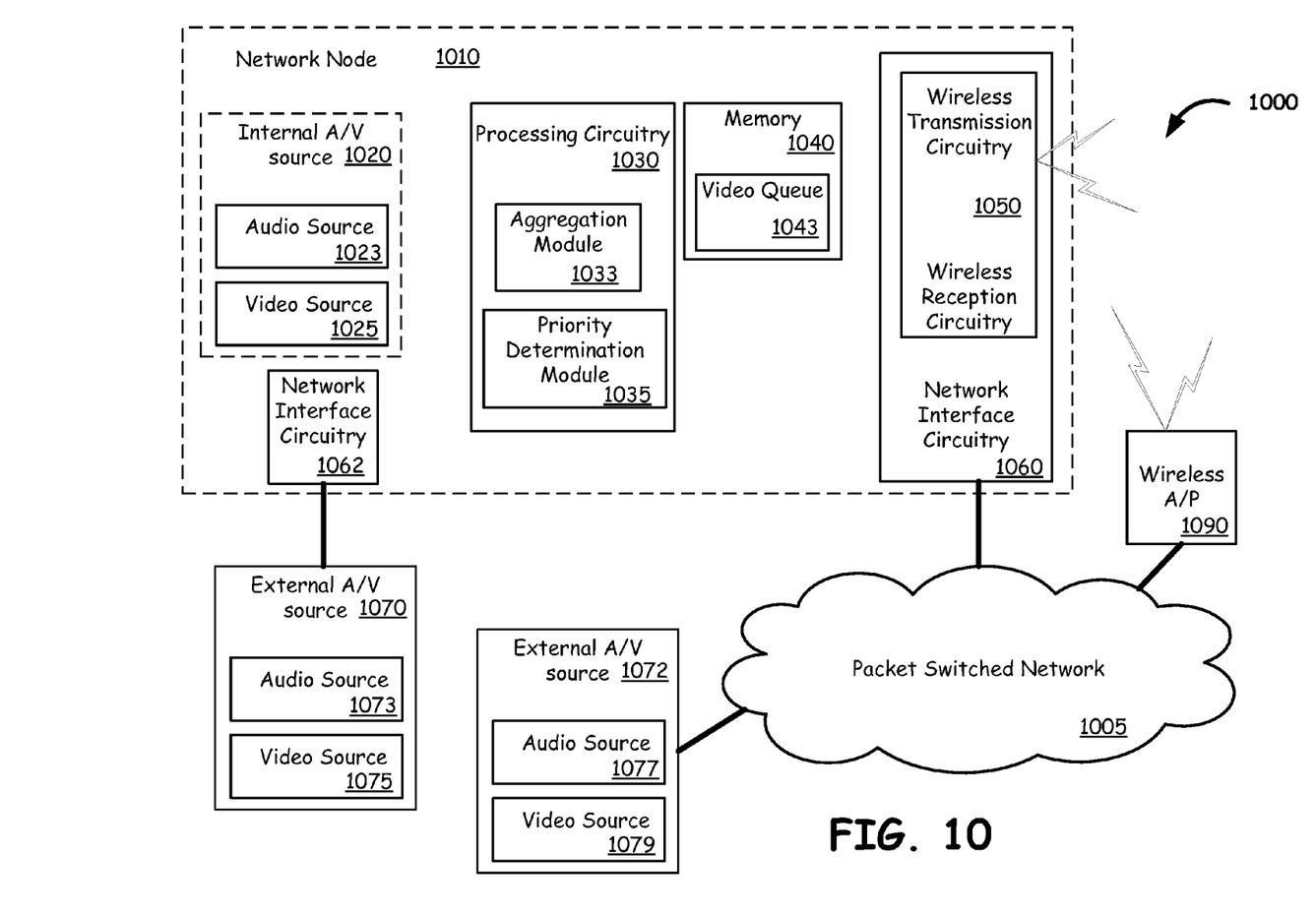
FIG. 10 is a block diagram illustrating a network node implementing out-of-turn priority packet transmission according to various embodiments of the present disclosure.

Referring next FIG. 10, communication network 1000 is illustrated and discussed. Communication network 1000 includes network node 1010, external A/V source 1070, external A/V source 1072, and wireless access point 1090 connected via a packet switched network 1005. Network node 1010 can include internal A/V source 1020 which may include audio source 1023 in video source 1025. Network node 1010 may also include processing circuitry 1030, which includes aggregation module 1033 and priority determination module 1035, memory 1040, which includes video queue 1043, and network interface circuitry 1060, which includes both wired connections and wireless transmission and reception circuitry 1050. Network node 1010 can receive audio video packets from external A/V source 1070, which includes audio source 1073 and video source 1075, via network interface circuitry 1062, from external A/V source 1072, which includes audio source 1077 and video source 1079, via network interface circuitry 1060, and from internal A/V source 1020.

Network node 1010 can be used to transmit blocks of data via network interface circuitry 1060, while maintaining priority transmission for real-time audio packet's. Video packets can be received at processing circuitry 1030 and aggregated into a transmission block by aggregation module 1033. Priority determination module 1035 can be used to determine whether a packet received by processing circuitry 1030 is a priority packet, for example a real-time audio packet. Processing circuitry 1030 can implement aggregation module 1033 and priority determination module 1035 using a layered communication protocol, so that packets received at the MAC layer are aggregated into a transmission block released to the PHY layer, implemented in part using network interface circuitry 1060, for transmission. During aggregation, video queue 1043, included in memory 1040, can be used to temporarily store data units being aggregated into the transmission block. Furthermore, when a priority data unit is received by processing circuitry 1030, the already aggregated PDUs can be temporarily stored until they are released, subsequent to the priority data unit being processed and released.

Figure 11:
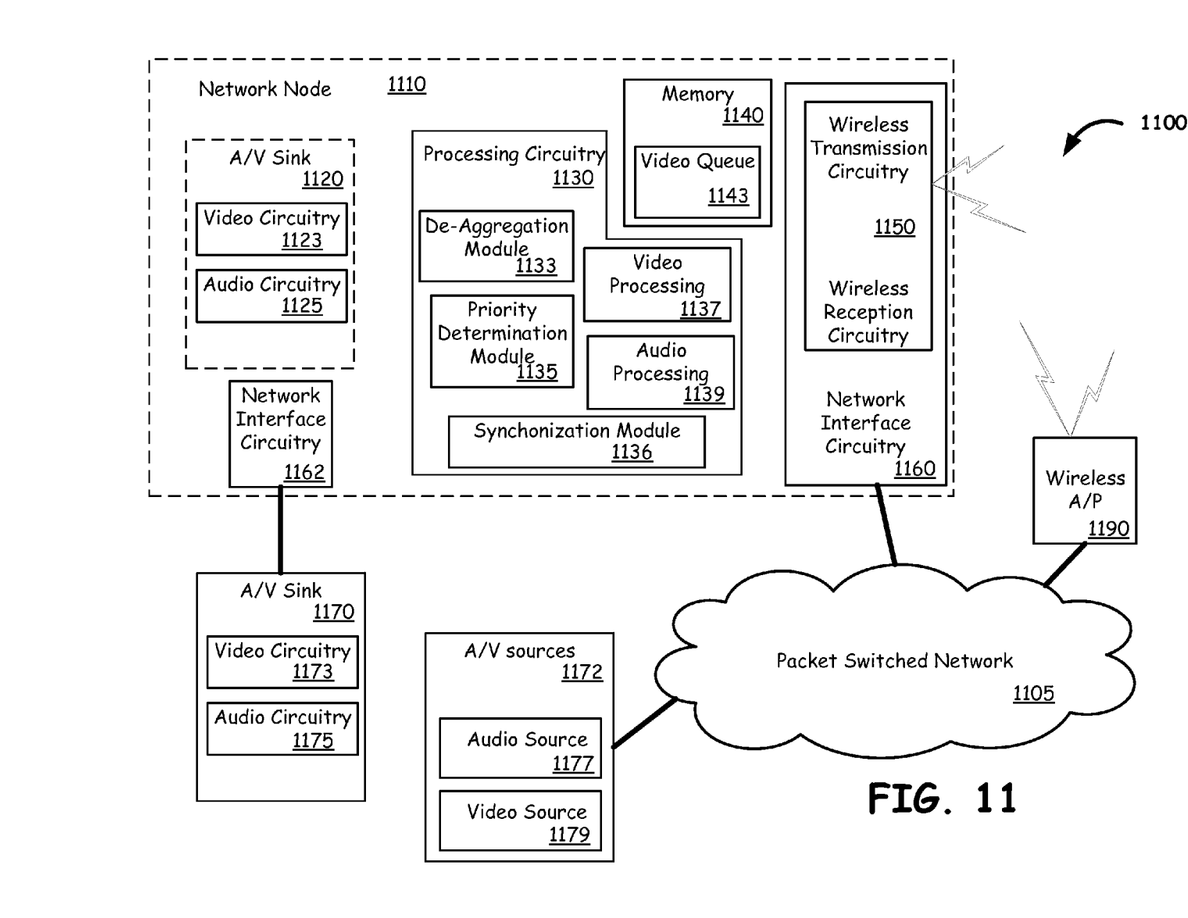
FIG. 11 is a diagram illustrating a system including a network node in a packet switched network, where the network node receives high and low priority packets and processes priority packets out-of-turn, according to various embodiments of the present disclosure.

Referring next to FIG. 11, a system 1100 according to various embodiments of the present disclosure is illustrated and discussed. System 1100 includes network node 1110, which is connected to A/V sync 1170, which includes video circuitry 1173 and audio circuitry 1175, via network interface circuitry 1162, and to A/V sources 1172, which includes audio source 1177 and video source 1179, via packet switched network 1105. Network node 1110 receives A/V content from packet switched network 1105 either through a wired connection to network interface circuitry 1160, or through wireless access point 1190. Network node 1110 includes memory 1140, which can be used to implement video queue 1143 to temporarily store video data during processing by processing circuitry 1130. Processing circuitry 1130 includes a video processing module 1137, audio processing module 1139, and synchronization module 1136 used to synchronize the video being processed by video processing module 1137 with audio processed by audio processing module 1139.

Processing circuitry 1130 also includes a de-aggregation module to segregate aggregated PDUs from received transmission blocks into individual PDUs for processing by video processing module 1137 and audio processing module 1139. Processing circuitry 1130 also includes a priority determination module 1135, which is used to set an order of processing in which audio packets can be processed and/or released for processing out of turn. For example, when a transmission block including multiple video packets is received at processing circuitry 1130, processing circuitry 1130 can send a block ACK indicating that the block of video packets has been received. The block ACK can also indicate whether or not some of the individual packets within the transmission block were corrupted or not received properly, and which packets need to be retransmitted. During processing of a received block of video content, if a priority packet is received, such as a real time audio packet, a timing packet, or some other sort of packet having a priority greater than the priority of the video packets being processed, the priority determination module 1135 can advance the priority packet out of turn, thereby helping to ensure that latency requirements of the priority packet are met. In some instances, de-aggregation and processing of the packets included in the transmission block is halted, at least temporarily, until a higher priority packet received during de-aggregation is processed.

Figure 12:
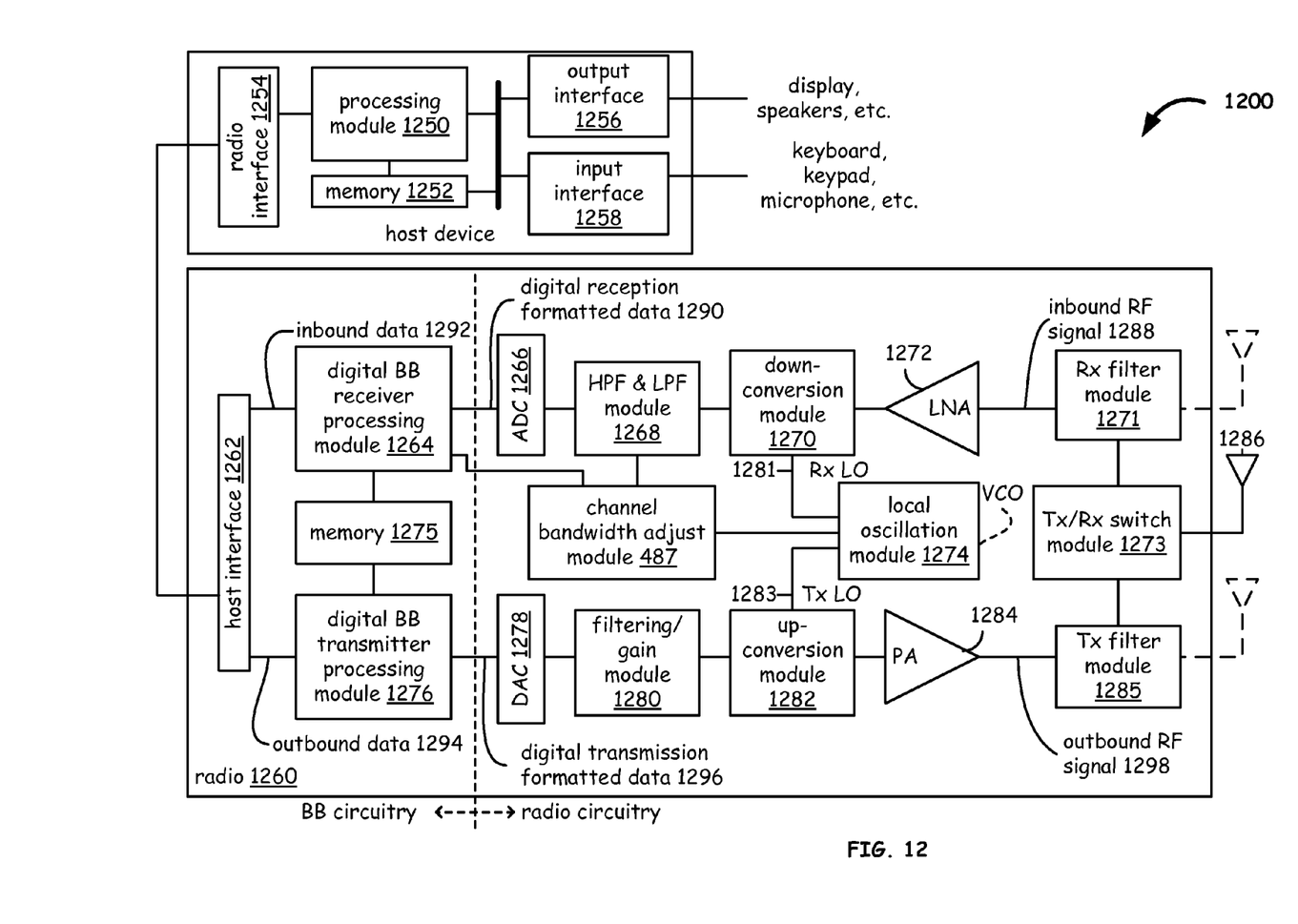
FIG. 12 is a block diagram of a wireless transceiver capable of implementing various embodiments of the present disclosure.

Referring next to FIG. 12, a diagram illustrating an embodiment of a wireless communication device 1200 that includes a host device 1201 and an associated radio 1260. For cellular telephone hosts, the radio 1260 is a built-in component. For personal digital assistants hosts, laptop hosts, and/or personal computer hosts, the radio 1260 may be built-in or an externally coupled component.

As illustrated, the host device 1201 includes a processing module 1250, memory 1252, a radio interface 1254, an input interface 1258, and an output interface 1256. The processing module 1250 and memory 1252 execute the corresponding instructions that are typically done by the host device. For example, for a cellular telephone host device, the processing module 1250 performs the corresponding communication functions in accordance with a particular cellular telephone standard.

The radio interface 1254 allows data to be received from and sent to the radio 1260. For data received from the radio 1260 (e.g., inbound data), the radio interface 1254 provides the data to the processing module 1250 for further processing and/or routing to the output interface 1256. The output interface 1256 provides connectivity to an output display device such as a display, monitor, speakers, etc., such that the received data may be displayed. The radio interface 1254 also provides data from the processing module 1250 to the radio 1260. The processing module 1250 may receive the outbound data from an input device such as a keyboard, keypad, microphone, etc., via the input interface 1258 or generate the data itself. For data received via the input interface 1258, the processing module 1250 may perform a corresponding host function on the data and/or route it to the radio 1260 via the radio interface 1254.

Radio 1260 includes a host interface 1262, digital receiver processing module 1264, an analog-to-digital converter 1266, a high pass and low pass filter module 1268, an IF mixing down conversion stage 1270, a receiver filter 1271, a low noise amplifier 1272, a transmitter/receiver switch 1273, a local oscillation module 1274 (which may be implemented, at least in part, using a voltage controlled oscillator (VCO)), memory 1275, a digital transmitter processing module 1276, a digital-to-analog converter 1278, a filtering/gain module 1280, an IF mixing up conversion stage 1282, a power amplifier 1284, a transmitter filter module 1285, a channel bandwidth adjust module 1287, and an antenna 1286. The antenna 1286 may be a single antenna that is shared by the transmit and receive paths as regulated by the Tx/Rx switch 1273, or may include separate antennas for the transmit path and receive path. The antenna implementation will depend on the particular standard to which the wireless communication device is compliant.

The digital receiver processing module 1264 and the digital transmitter processing module 1276, in combination with operational instructions stored in memory 1275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 1264 and 1276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 1275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 1264 and/or 1276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 1260 receives outbound data 1294 from the host device via the host interface 1262. The host interface 1262 routes the outbound data 1294 to the digital transmitter processing module 1276, which processes the outbound data 1294 in accordance with a particular wireless communication standard (e.g., IEEE 802.11, Bluetooth, Zig-Bee, WiMAX (Worldwide Interoperability for Microwave Access), any other type of radio frequency based network protocol and/or variations thereof etc.) to produce outbound baseband signals 1296. The outbound baseband signals 1296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 1278 converts the outbound baseband signals 1296 from the digital domain to the analog domain. The filtering/gain module 1280 filters and/or adjusts the gain of the analog signals prior to providing it to the IF mixing stage 1282. The IF mixing stage 1282 converts the analog baseband or low IF signals into RF signals based on a transmitter local oscillation 1283 provided by local oscillation module 1274. The power amplifier 1284 amplifies the RF signals to produce outbound RF signals 1298, which are filtered by the transmitter filter module 1285. The antenna 1286 transmits the outbound RF signals 1298 to a targeted device such as a base station, an access point and/or another wireless communication device.

The radio 1260 also receives inbound RF signals 1288 via the antenna 1286, which were transmitted by a base station, an access point, or another wireless communication device. The antenna 1286 provides the inbound RF signals 1288 to the receiver filter module 1271 via the Tx/Rx switch 1273, where the Rx filter 1271 bandpass filters the inbound RF signals 1288. The Rx filter 1271 provides the filtered RF signals to low noise amplifier 1272, which amplifies the signals 1288 to produce an amplified inbound RF signals. The low noise amplifier 1272 provides the amplified inbound RF signals to the IF mixing module 1270, which directly converts the amplified inbound RF signals into an inbound low IF signals or baseband signals based on a receiver local oscillation 1281 provided by local oscillation module 1274. The down conversion module 1270 provides the inbound low IF signals or baseband signals to the filtering/gain module 1268. The high pass and low pass filter module 1268 filters, based on settings provided by the channel bandwidth adjust module 1287, the inbound low IF signals or the inbound baseband signals to produce filtered inbound signals.

The analog-to-digital converter 1266 converts the filtered inbound signals from the analog domain to the digital domain to produce inbound baseband signals 1290, where the inbound baseband signals 1290 will be digital base-band signals or digital low IF signals, where the low IF typically will be in the frequency range of one hundred kHz to a few MHz. The digital receiver processing module 1264, based on settings provided by the channel bandwidth adjust module 1287, decodes, descrambles, demaps, and/or demodulates the inbound baseband signals 1290 to recapture inbound data 1292 in accordance with the particular wireless communication standard being implemented by radio 1260. The host interface 1262 provides the recaptured inbound data 1292 to the host device 318-332 via the radio interface 1254.

As one of average skill in the art will appreciate, the wireless communication device of the embodiment 1200 of FIG. 12 may be implemented using one or more integrated circuits. For example, the host device may be implemented on one integrated circuit, the digital receiver processing module 1264, the digital transmitter processing module 1276 and memory 1275 may be implemented on a second integrated circuit, and the remaining components of the radio 1260, less the antenna 1286, may be implemented on a third integrated circuit. As an alternate example, the radio 1260 may be implemented on a single integrated circuit. As yet another example, the processing module 1250 of the host device and the digital receiver and transmitter processing modules 1264 and 1276 may be a common processing device implemented on a single integrated circuit. Further, the memory 1252 and memory 1275 may be implemented on a single integrated circuit and/or on the same integrated circuit as the common processing modules of processing module 1250 and the digital receiver and transmitter processing module 1264 and 1276.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a Figure of any of the Figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprising:
   receiving a plurality of protocol data units (PDUs);
   initiating aggregation of the plurality of PDUs into a transmission block including an intended number of PDUs;
   receiving a priority PDU;
   determining whether the priority PDU is to be included in the transmission block;
   inserting the priority PDU into the transmission block or releasing the priority PDU separately and before releasing the already aggregated PDUs in accordance with the determination; and
   resuming aggregation of the plurality of PDUs.

2. The method of claim 1, wherein releasing the priority PDU comprises:
   when the priority PDU is not to be included in the transmission block:
      subsequently releasing the transmission block even though the transmission block includes fewer than the intended number of PDUs.

3. The method of claim 1, wherein inserting the priority PDU into the transmission block comprises:
   aggregating the priority PDU into the transmission block to generate a priority transmission block; and
   releasing the priority transmission block.

4. The method of claim 1, wherein:
   receiving the plurality of PDUs includes receiving the plurality of PDUs at a first processing layer; and
   wherein releasing the priority PDU includes releasing the priority PDU for transmission to a second processing layer.

5. The method of claim 1, wherein:
   the plurality of PDUs consist essentially of a first category of PDUs;
   the priority PDU consists essentially of a second category of PDUs; and wherein
   the second category of PDUs has a higher priority than the first category of PDUs.

6. The method of claim 5, wherein:
   PDUs included in the second category are more sensitive to latency than PDUs included in the first category.

7. The method of claim 1, wherein:
   each of the plurality of PDUs includes video data to be synchronized to audio data; and
   the priority PDU includes time-stamped audio data used to synchronize the video data.

8. The method of claim 1, wherein:
   each of the plurality of PDUs includes video data; and
   the priority PDU includes an end-of-frame indicator.

9. A node in a communication system comprising:
an interface configured to receive a plurality of packets to be delivered via a network employing a non-sequential communication protocol;
memory coupled to the interface and configured to buffer at least some of the plurality of packets during packet aggregation;
processing circuitry operably coupled to the memory, the processing circuitry configured to:
aggregate the plurality of packets into a transmission block until a priority data packet is encountered;
determine whether the priority data packet is to be included in the transmission block;
insert the priority data packet into the transmission block or release the priority data packet separately and before releasing the already aggregated packets in accordance with the determination; and
release the transmission block.

10. The node of claim 9, wherein the processing circuitry is further configured to:
when the priority data packet is not to be included in the transmission block,
subsequently releasing the transmission block even though the transmission block includes fewer than an intended number of packets.

11. The node of claim 9, wherein inserting the priority data packet into the transmission block comprises:
inserting the priority data packet in the transmission block to generate a priority transmission block; and
releasing the priority transmission block.

12. The node of claim 9, wherein:
the plurality of packets carry a first category of data;
the priority data packet carries a second category of data; and wherein
the second category of data has a higher priority than the first category of data.

13. The node of claim 9, wherein:
each of the plurality of packets carries media data; and
the priority data packet includes a timing packet.

14. The node of claim 9, wherein:
each of the plurality of packets includes video data to be synchronized to audio data; and
the priority data packet includes the audio data to which the video data is to be synchronized.

15. The node of claim 9, wherein:
each of the plurality of packets includes video data; and
the priority data packet includes a data boundary marker indicator.

16. A node in a packet switched communication system, the node comprising:
an interface to receive a plurality of protocol data units (PDUs), wherein the plurality of PDUs includes a plurality of first PDUs having a first priority and at least one priority PDU having a priority higher than the first priority;
processing circuitry and associated memory configured to:
aggregate the plurality of first PDUs into a transmission block until a priority PDU is encountered;
make a determination about whether the priority PDU is to be included in the transmission block; and
insert the priority PDU into the transmission block or release the priority PDU separately and before releasing the already aggregated first PDUs in accordance with the determination.

17. The node of claim 16, wherein the processing circuitry and associated memory are further configured to:
in response to the determination indicating that the priority PDU is not to be included in the transmission block:
subsequently release the transmission block, even though the transmission block includes fewer than an intended number of PDUs.

18. The node of claim 16, wherein inserting the priority PDU into the transmission block comprises:
in response to determining that the priority PDU is to be included in the transmission block:
aggregating the priority PDU into the transmission block to generate a priority transmission block; and
releasing the priority transmission block.

19. The node of claim 16, wherein:
the plurality of first PDUs carry media data; and
the priority PDU includes a timing packet.

20. The node of claim 19, wherein:
the plurality of first PDUs carry video content; and
the priority PDU carries audio data.

* * * * *